United States Patent [19]
Smith

[11] 3,722,478
[45] Mar. 27, 1973

[54] TETHER ASSEMBLY
[76] Inventor: Robert G. Smith, P.O. Box 55, John Ct., Ironia, N.J. 07845
[22] Filed: June 9, 1970
[21] Appl. No.: 44,759

[52] U.S. Cl. ................................................ 119/120
[51] Int. Cl. .............................................. A01k 03/00
[58] Field of Search ............................. 119/120, 117

[56] References Cited

UNITED STATES PATENTS

| | | | |
|---|---|---|---|
| 244,843 | 7/1881 | Battelle | 119/117 |
| 249,904 | 11/1881 | Covert | 119/117 |
| 336,295 | 2/1886 | Coleman | 119/120 |
| 225,404 | 3/1880 | Maxey | 119/120 |
| 3,395,675 | 8/1968 | Fowlkes | 119/120 |

*Primary Examiner*—Hugh R. Chamblee
*Attorney*—Bernard J. Murphy

[57] ABSTRACT

A tether assembly, for restraining an animal, child, or other object of restraint, formed of a plurality of rigid, elongated link members. The members are rod-stock components which may be sheathed in a protective covering of plastic, rubber, leather, nylon or the like. Each rod-stock member has linkage means for coupling an end thereof to another member, and each may be of the same length as another member of unique length. One of the linkage means at one end of one of the rod-stock members defines a handle loop for use in walking or otherwise exercising the child, animal, or whatever.

At either ends of the assembly are couplings for attaching the assembly to a given anchor of some fixed structure — i.e., an elevated line, a hook extending from the wall of a dwelling, a ground stake, or other anchor means — at a given elevation, or at ground level, respectively. Due to the rigidity of the members and swivel functioning of the couplings, a portion of the tether is forced to move away from the tethered object when the latter moves into proximity with the anchor means.

7 Claims, 7 Drawing Figures

PATENTED MAR 27 1973 3,722,478
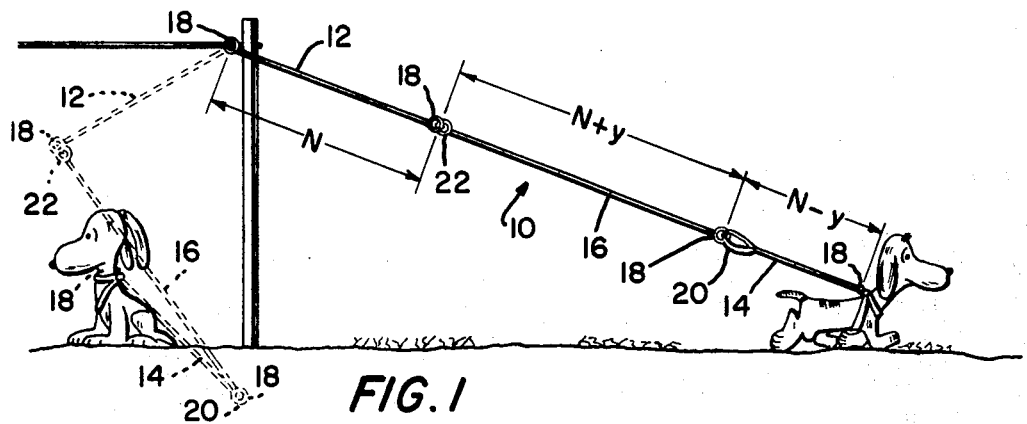
FIG. 1
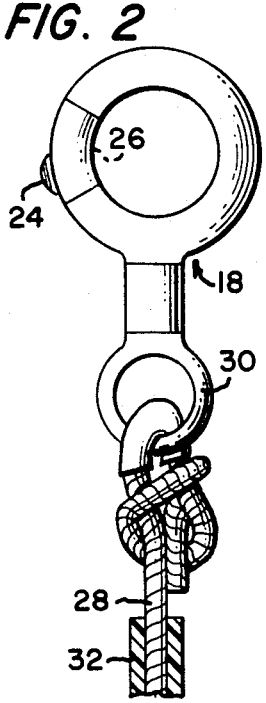
FIG. 2
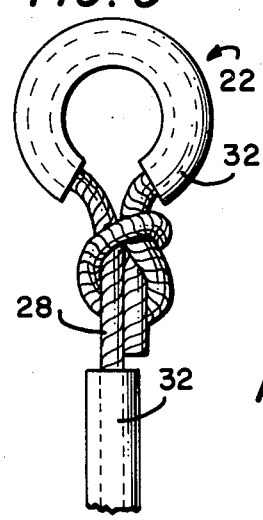
FIG. 3
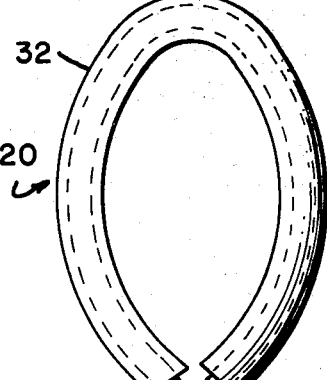
FIG. 4
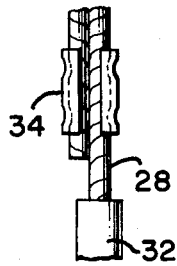
FIG. 6
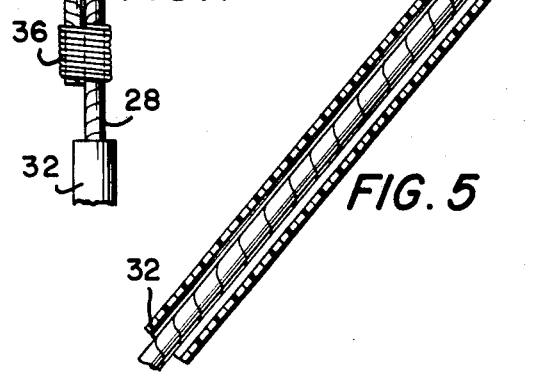
FIG. 7
FIG. 5
INVENTOR
ROBERT G. SMITH
BY
Bernard J. Murphy
AGENT

TETHER ASSEMBLY

This invention pertains to tether assemblies used for restraining animals, or small children, and the like, and in particular to a tether assembly which provides for wide freedom of movement while inhibiting an entanglement or snagging of the assembly within the area of free movement.

Tether assemblies commonly used for animals or children are supple, filamentary types, or chains and like products. Whether these known tether assemblies are clipped to elevated "run" lines, or anchored to structures — i.e., a dog house, a hook projecting from the wall of a residence, a tree, or ground stake — they are given to entanglement, looping, and knotting. Further, they become snagged on ground structures, become wrapped about trees and shrubs, and worse, they form snares which engage and envelop the limbs of persons traversing the area of movement which they provide.

A strong and active tethered animal will, in the course of play, circle about a small child and, due to the suppleness of the tether material, the tether assembly will enwrap the legs of the child and pull the child to the ground. It will even happen that the tether material will encircle the child's neck. The dangers inherent with known tether assemblies are both commonly known and numerous, not to mention the damage they are given to cause to shrubs, toys, etc. which happen to locate within the area whereat the tether assembly is anchored. In addition, the disadvantages which obtain for the known tether assemblies at least give rise to considerable frustration for the tethered animal or child; at worst, they can place the tethered object in serious jeopardy of injury.

It is an object of this invention to teach a tether assembly which avoids the disadvantages known to attend the prior tether assemblies.

It is another object of this invention to teach a tether assembly which comprises a plurality of rigid, elongated members having means for linking said members together.

It is an object of this invention to set forth a tether assembly comprising an elongated tether, said tether having means at one end thereof for coupling to a given anchor means, and means at the other end thereof for coupling to an object of restraint, with means automatically effective for forcing a portion of said tether to move away from said object upon said object moving into proximity with said given anchor means, and means for causing a portion of said tether to pivot about said anchor means coincident with said object moving into proximity with said anchor means.

A feature of this invention comprises the provisioning of a tether assembly formed of a plurality of rigid, elongated, rod-stock members, the members being detachably linked together. Each member has means for coupling an end thereof to another member, and one of the coupling means of one of the members defines a handle loop for use in walking or other-wise exercising the tethered object.

Further objects and features of this invention will become more apparent by reference to the following description, taken in conjunction with the accompanying figures, in which:

FIG. 1 is a side elevation of a tether assembly, according to an embodiment of the invention, showing the plurality of rigid, elongated members linked together, clipped to an overhead "run" line, at one end thereof, and to an animal at the other end thereof;

FIG. 2 is an enlarged view of a swivel-clip termination which, in a preferred embodiment, is common to all the linked members;

FIG. 3 is an enlarged view of a closed-loop termination which is formed at one end of one of the linked members, according to the preferred embodiment;

FIG. 4 is an enlarged view of a closed-loop termination which is formed at one end of another of the linked members and which serves as a handle for a short walking leash, in the preferred embodiment;

FIG. 5 is an axial cross-section, typical of each of the linked members, taken along an intermediate portion of one of said members, showing the rod stock about which, in this embodiment, is disposed a protective sheathing; and FIGS. 6 and 7 illustrate fragments of the linked members, in alternate embodiments, in which the fabricating rod stock, at the terminations thereof, is finished off by use of a rigid clamp, or by wire or other filamentary wrapping, respectively.

As shown in FIG. 1, a tether assembly 10, according to an embodiment of my invention, comprises a plurality of rigid, elongated members. In the embodiment shown, the assembly has a first member 12, having a length of N, at one end of the assembly, a second member 14, having a length of N−y, at the other end of the assembly, and a third member 16, having a length of N+y, disposed between said first and second members. First member 12 carries swivel-mounted clips 18 at either ends thereof. Second member 14 carries a swivel-mounted clip 18 at one end thereof, and a fixedly closed, elongated loop 20 at the other end thereof. Third member 16 carries a swivel-mounted clip 18 at one end thereof, and a fixedly closed, round loop 22 at the other end thereof.

The elongated members 12, 14, and 16, in this embodiment, are formed of metal rod stock. However, they could be formed of rigid plastic. Also, taking teaching from my invention, those skilled in the art can devise link members, elongated members, of other rigid materials, — wood, for instance — and my invention comprises all such different embodiments and practices.

In FIG. 2 it is shown that the swivel-mounted clips 18, the one illustrated being typical of them all, defines a circlet or loop. On the outer periphery of the loop extends an operating tang 24 which, under digital pressure, opens an access 26 to facilitate the coupling of the clip 18 to an eyebolt, an overhead line, a ring element of a ground stake, and like anchoring objects as well as for coupling thereof to the round loop 22, the elongated loop 20, and for engaging the attachment ring of a collar or harness. The rod stock is looped through an eyelet 30 of the clip 18, and wrapped about itself, to secure the clip to the end of the rigid, elongate member (12, 14 or 16).

The round loop 22, as FIG. 3 evidences, is simply formed by bending the rod stock 28 back upon itself, and winding the terminal end about a portion thereof.

The elongated loop 20, shown in FIG. 4, is fashioned like loop 22, except that it is made larger to accommodate hand gripping, and has sheathing fully about the elongate loop portion. Loop 20 can be detached from the clip 18 of member 16. Thus, loop 20 and member 14 — together with its clip 18 — provide a walking or exercise leash for the tethered object.

Save for where the rod stock 28 is wound about itself, in the individual elongate link members, the stock is sheathed with a protective sleeve 32, as depicted in FIG. 5. But this is a matter of choice. In that my invention embraces the teaching of use of wood, or rigid plastic, or like materials, for elongated members 12, 14, and 16, which may or may not warrant protective covering, it follows that my disclosure teaches unsheathed elongated members.

This novel tether assembly 10 of my teaching, in having rigid members 12, 14, and 16, will not entwine itself about a tree, pole, or ground obstruction. Neither can it wind about the limbs of any person traversing the area in which it gives the tethered object free movement. My inventive tether assembly cannot become knotted, entangled, or looped, neither can it ensnare the feet of the tethered animal, child, or other object of restraint.

When a tethered animal, for instance, "tries" the tether assembly 10, and realizes the maximum reach possible, the tether assembly defines a substantially linear configuration — from anchor point to the animal — as shown in the heavy line presentation in FIG. 1. However, when the animal moves into proximity with the point whereat the tether assembly is anchored to the fixed structure — i.e., the overhead "run" line, as shown, or a hook or eyebolt projecting from the side of a wall of a dwelling, or whatever (such wall mounting not being shown), a most desirable effect takes place. A portion of the tether assembly is forced to move away from the animal. With the animal in proximity to, or approaching proximity with, the anchor point, the distance between the animal and the anchor point — as compared to the linear, full reach or the tether assembly, — must become foreshortened. However, the linked members 12, 14, and 16 cannot bend; the linked junctures of members 12 and 14 with member 16 can do nothing else except to define an angle between members 16 and 12, and an angle between members 16 and 14. However the animal moves, relative to the tether assembly anchor point, the tether assembly is forced to move out of the animal's way.

When the tether assembly is anchored to an elevated line, a shown in FIG. 1, at an elevation slightly greater than a distance of N (i.e., at an elevation slightly greater than member 12), the only portion of the tether assembly 10 which can ever touch the ground is the juncture of loop 20 and its mating clip 18. This effect is illustrated, in FIG. 1, in the dashed-line view. When installed in this fashion, then, my novel tether assembly only ever makes a point-contact with the ground.

Others will learn from my disclosure that it would be possible to dispense with member 14, and provide a tether assembly elevatedly anchored which never would touch the ground. My invention contemplates this teaching as well. However, the preferred embodiment described herein will accommodate the animal's retreat into the portal of a kennel or dog-house or whatever, in having the shorter member 14, which accommodation will not obtain if member 14 is dispensed with. So also, of course, while I depict an embodiment having three rigid members 12, 14, and 16, my invention contemplates the addition of one or more members — such as member 12, for instance — as the circumstances of use for the tether assembly warrant.

In the embodiment disclosed, for purposes of illustration, I set forth specific types of coupling elements. Clip 18, for example, is a common, known item of hardware. Obviously, other types of clips can be used with equal facility. So too, I find it to advantage in the practice of the invention to provision swivelling motion for each of the rigid members. This is shown as provisioned in having at least one of the known swivelling clips 18 at one end of each of the members; in other practices of the invention it may be found useful to have swivelling clips at both ends of two of the members. Also, depending upon the workability of rod stock 28 chosen for use, it may be found simpler not attempting to wrap or knot the rod stock itself — to secure clips 18, or to form loops 20 and 22. Therefore, as shown in FIGS. 6 and 7, I teach alternate embodiments of tether assembly terminations.

In FIG. 6 the rod stock has been bent upon itself (to form loops) and is disposed in juxtaposition; the bent, terminal end is placed alongside a linear portion of the stock 28. Then a rigid metal clamp 34 is closed on both the terminal end and the juxtapositioned portion. The option shown in FIG. 7 teaches the same juxtapositioning of the terminal end of the stock 28, but here I teach the practice of enwrapping the terminal end and the linear stock portion with wire 36.

While I have described my invention in connection with specific embodiments thereof, it is to be clearly understood that this is done only by way of example and not as a limitation to the scope of my invention as set forth in the objects thereof and in the appended claims.

I claim:

1. A tether assembly, for securing an object of restraint, such as an animal, a child, and the like, comprising:
    a plurality of rigid, elongate members;
    each of said members having means cooperative with another of said members for effecting a separable linking together of said members;
    one of said members further having means for coupling one end thereof to a fixed structure; and
    another of said members further having means for coupling one end thereof to said object; wherein
    said one member and said structure coupling means therefor together comprise not more than one pair of rigid and mutually articulatable coupled elements;
    said another member and said object coupling means therefor together comprise not more than one pair of rigid and mutually articulatable coupled elements;
    said cooperative means each comprise a pair of engaged loop elements;
    one loop element of each pair thereof being fixedly closed, and the other loop element of each pair thereof having means facilitating its being broached to engage said one loop element; and
    a given one loop element, of one pair of loop elements, defines a sheathed handle for use for walking and otherwise exercising said object.

2. A tether assembly, according to claim 1, wherein:

said cooperative means further comprise means facilitating a swivelling rotation of at least one of said loop elements about the elongate axis of said members.

3. A tether assembly, according to claim 1, wherein:
said elongated members comprise rod stock; and
said closed loops are formed from said rod stock, one end of given ones of said rod-stock members being bent, from the elongate axis of each of said one members, and wrapped about a portion of said one members, to define a circlet at said one end.

4. A tether assembly, according to claim 1, wherein:
said elongated members comprise rod stock; and
said closed loops are formed from said rod stock, one end of given ones of said rod-stock members being bent, from the elongate axis of each of said one members, and disposed in juxtaposition with a portion of said one member adjacent to said one end; and further including
means for arresting said one end fixedly in juxtaposition with said portion.

5. A tether assembly, according to claim 3, further including: protective sheathing enveloping said rod stock.

6. A tether assembly, according to claim 4, wherein:
said plurality comprises not less than three members; and
at least one of said members is of shorter length than the other members.

7. A tether assembly, according to claim 4, wherein:
said plurality comprises at least three members; and
at least one of said members is of greater length than the other members, and at least one of said members is of shorter length than the other members.

* * * * *